United States Patent
Thygesen

(10) Patent No.: US 8,496,281 B2
(45) Date of Patent: Jul. 30, 2013

(54) MODULAR DECK SYSTEMS AND APPARATUS FOR PICKUP TRUCKS AND OTHER VEHICLES HAVING CARGO BEDS

(76) Inventor: Mark Thygesen, Edmonton (CA)

( * ) Notice: Subject to any disclaimer, the term of this patent is extended or adjusted under 35 U.S.C. 154(b) by 147 days.

(21) Appl. No.: 12/913,052

(22) Filed: Oct. 27, 2010

(65) Prior Publication Data
US 2011/0260486 A1    Oct. 27, 2011

Related U.S. Application Data

(60) Provisional application No. 61/255,332, filed on Oct. 27, 2009.

(51) Int. Cl.
*B60P 3/34* (2006.01)

(52) U.S. Cl.
USPC ........................................... 296/26.12

(58) Field of Classification Search
USPC .......... 296/26.12, 26.09, 26.02, 26.03, 26.13; 114/362, 85, 72, 75; 52/177, 302.1, 650.3; 244/137.1; 256/24; 224/328
See application file for complete search history.

(56) References Cited

U.S. PATENT DOCUMENTS

| | | | | |
|---|---|---|---|---|
| 4,552,085 A * | 11/1985 | Eder et al. | .................. | 114/84 |
| 4,566,243 A * | 1/1986 | Dahlin | .................. | 52/578 |
| 4,856,446 A * | 8/1989 | Herard | .................. | 114/61.22 |
| 4,947,595 A * | 8/1990 | Douds et al. | .................. | 52/177 |
| 4,951,992 A * | 8/1990 | Hockney | .................. | 296/204 |
| 5,359,954 A * | 11/1994 | Kordelin | .................. | 114/85 |
| 5,393,114 A * | 2/1995 | Christensen | .................. | 296/36 |
| 5,470,120 A * | 11/1995 | Christensen | .................. | 296/3 |
| 5,617,689 A * | 4/1997 | Beane | .................. | 52/489.1 |
| 5,660,016 A * | 8/1997 | Erwin et al. | .................. | 52/483.1 |
| 5,758,467 A * | 6/1998 | Snear et al. | .................. | 52/592.1 |
| 5,836,128 A * | 11/1998 | Groh et al. | .................. | 52/580 |
| 5,881,508 A * | 3/1999 | Irvine et al. | .................. | 52/177 |
| 5,941,027 A * | 8/1999 | Hallsten | .................. | 52/64 |
| 5,950,377 A * | 9/1999 | Yoder | .................. | 52/177 |
| 6,035,588 A * | 3/2000 | Zehner et al. | .................. | 52/98 |
| 6,131,355 A * | 10/2000 | Groh et al. | .................. | 52/592.1 |
| 6,272,808 B1 * | 8/2001 | Groh et al. | .................. | 52/592.1 |
| 6,513,297 B2 * | 2/2003 | Kloepfer | .................. | 52/588.1 |
| 6,554,340 B1 * | 4/2003 | Stevenson | .................. | 296/26.11 |
| 6,688,673 B2 * | 2/2004 | Kloepfer | .................. | 296/181.1 |
| 6,871,904 B2 * | 3/2005 | Bhat et al. | .................. | 296/183.1 |
| 7,073,816 B1 * | 7/2006 | Larson et al. | .................. | 280/656 |
| 7,169,460 B1 * | 1/2007 | Chen et al. | .................. | 428/195.1 |
| 7,188,576 B2 * | 3/2007 | Bogard et al. | .................. | 114/85 |
| 7,211,310 B2 * | 5/2007 | Chen et al. | .................. | 428/54 |
| 7,302,725 B2 | 12/2007 | Thygesen | | |

(Continued)

*Primary Examiner* — Kiran B Patel
(74) *Attorney, Agent, or Firm* — Bereskin & Parr LLP

(57) ABSTRACT

A deck system for a vehicle having a cargo bed. The deck system includes a deck body that extends across at least a portion of the cargo bed. The deck body includes a plurality of planks, each plank having an upper surface, a lower surface, and first and second opposing edges, each first edge configured to interlock with the second edge of another plank. The plurality of planks are coupled together via their interlocking edges to form the deck body. The deck system may also include a rail assembly configured to be coupled to side rails of the cargo bed and to the deck body for supporting the deck body above the cargo deck. The first edge of each plank has at least one first hook member and the second edge of each plank has at least one second hook member, the at least one second hook member configured to engage with the at least one first hook member of another plank.

17 Claims, 13 Drawing Sheets

U.S. PATENT DOCUMENTS

| | | | |
|---|---|---|---|
| 7,354,089 B2 * | 4/2008 | Hobrecht | 296/26.07 |
| 7,488,027 B2 * | 2/2009 | Liao | 296/76 |
| 7,506,909 B2 * | 3/2009 | Barnes | 296/26.13 |
| 7,533,500 B2 * | 5/2009 | Morton et al. | 52/177 |
| 7,575,264 B1 * | 8/2009 | Solomon | 296/26.02 |
| 7,631,470 B2 * | 12/2009 | Kinoshita | 52/591.5 |
| 7,793,470 B1 * | 9/2010 | Mathiesen et al. | 52/177 |
| 8,007,024 B2 * | 8/2011 | Kealy | 296/100.02 |
| 8,020,911 B2 * | 9/2011 | McKelvey | 296/26.09 |
| 2007/0007785 A1 | 1/2007 | Thygesen | |
| 2008/0209839 A1 * | 9/2008 | Amato | 52/588.1 |
| 2011/0062736 A1 * | 3/2011 | Skoglun | 296/26.02 |

* cited by examiner

MODULAR DECK SYSTEMS AND APPARATUS FOR PICKUP TRUCKS AND OTHER VEHICLES HAVING CARGO BEDS

RELATED APPLICATIONS

This application claims the benefit of U.S. Provisional Patent Application Ser. No. 61/255,332 filed Oct. 27, 2009, the entire contents of which are hereby incorporated by reference herein for all purposes.

TECHNICAL FIELD

The embodiments disclosed herein relate to cargo decks for vehicles and in particular to modular deck systems and apparatus for pickup trucks and other vehicles having cargo beds.

INTRODUCTION

Pickup trucks and other similar vehicles have an open-top cargo area or "bed" which may be used for hauling loads (e.g. construction materials, furniture, tools, etc.). Usually, the cargo bed is located at the rear of the truck behind a cab where the driver and any passengers may sit.

The cargo bed is often enclosed on opposing outer edges with side rail body panels that extend upwardly from the floor of the bed, and a similar front body panel that extends upwardly from the floor near the front of the bed. Often, a hinged rear tailgate is provided at the rear of the bed so that the bed may be enclosed around its edges to help secure cargo therein.

Cargo beds are provided in various shapes and sizes depending on the type of vehicle and to accommodate different types of cargo. For example, cargo beds on compact trucks are often about 50 inches wide, whereas cargo beds on full sized trucks are often between 60 and 70 inches wide.

Similarly, the lengths of cargo beds can vary greatly. A short bed is generally the most popular, and is usually about 6 feet long. Full-size beds, on the other hand, may be about 6.5 feet long, while long beds may in some cases be 7 or 8 feet long. Other vehicles, such as sport utility vehicles, may have cargo beds, which may be similarly sized, or may be larger or smaller.

Various types of cargo decks have been developed for storing and transporting objects (e.g. snowmobiles, all-terrain vehicles, etc.) above the floor of these cargo beds. For example, US Patent Application Publication No. 2007/0007785 (Thygesen) describes a cargo deck, including a deck substrate supporting structural frame having a front end, a rear end, and opposed sides. The structural frame is formed from a least two "H" section cross-members consisting of elongated square tubing having opposed pairs of parallel flanges which form an "H" shaped cross-section, receiver channels being defined by the opposed pairs of parallel flanges. Longitudinally oriented square connective tubing has opposed ends secured within the receiver channels of the "H" section cross-members. Longitudinally oriented "Z" section beams are secured to an underside of the square connective tubing and the "H" section cross-members. An underlying support structure is secured to the "Z" section beams.

Since various sizes of cargo beds are available, decks designed for one specific size of cargo bed may not be suitable for use with other cargo beds. Accordingly, the inventor has identified a need for improved cargo decks for use with pickup trucks and other vehicles having cargo beds.

SUMMARY

According to one aspect, there is provided a deck system for a vehicle having a cargo bed, comprising a deck body that extends across at least a portion of the cargo bed, the deck body comprising a plurality of planks, each plank having an upper surface, a lower surface, and first and second opposing edges, each first edge configured to interlock with the second edge of another plank, the plurality of planks being coupled together via their interlocking edges to form the deck body, and a rail assembly configured to be coupled to side rails of the cargo bed and to the deck body for supporting the deck body above the cargo deck.

In some embodiments, the first edge of each plank has at least one first hook member and the second edge of each plank has at least one second hook member, the at least one second hook member configured to engage with the at least one first hook member of another plank. The first and second hook members may be sized and shaped so as to fit snuggly together when two or more planks are coupled together.

The plurality of planks may include a quantity of planks selected so that when the planks are coupled together the deck body covers the entire length of the cargo bed.

Each of the planks may be of sufficient length so that the deck body spans the entire width of the cargo bed.

In some embodiments, the rail assembly includes a pair of elongate rail capture members, each rail capture member having a mounting flange configured to be supported by an upper surface of one of the side rails and a main body configured to be coupled to the deck body.

The rail assembly may further includes at least one elongate rail section configured to be coupled to the rail capture member and to support the deck body at a distance above the rail capture member.

Each rail section may have at least one groove therein, the rail capture member having at least one ridge therein configured to engage the groove in the rail section to secure the rail section to the rail capture member.

The rail assembly may further comprise at least one leg member configured to be coupled to one of the rail capture members and a floor of the cargo bed so as to support the rail assembly.

In some embodiments, at least one of the planks is a main plank having a hollow aperture therein. At least one of the planks may be a secondary plank, each secondary plank having at least one capture channel therein.

In some embodiments, the deck system may further comprise at least one slider assembly, each slider assembly configured to be extended out from the sides of the deck body. Each slider assembly may includes at least one elongate slider member, each slider member having a first end and a second end opposite the first end, the second end is configured to be slidably received in the aperture in one of the main planks, and at least one elongate side member configured to securely engage the first end of the at least one slider member.

At least one elongate side member may include a lower side member, and an upper side member coupled to the lower side member so as to define an elongate channel therebetween, wherein the channel is configured to securely engage the first end of the at least one slider member at locations within the channel that correspond to the locations of the main planks in the deck body.

In some embodiments, each leg comprises at least one capture channel extending lengthwise along at least part of its longitudinal length.

The deck system may further comprise at least one wedge, each wedge configured to secure two of the plurality of planks together. Each wedge may be configured to be received between hook members on two adjacent planks to secure the two planks together According to another aspect, there is provided rail assembly for a vehicle having a cargo bed, comprising at least one elongate rail capture member, each rail capture member having a mounting flange configured to be supported by an upper surface of one of the side rails and a main body, and at least one leg member configured to be coupled to one of the rail capture members and a floor of the cargo bed so as to support the rail assembly, wherein at least one of the main body and the at least one leg member have a capture channel extending along the length thereof and configured to receive a fastener for securing objects to the rail assembly.

According to yet another aspect, there is provided deck system for a vehicle having a cargo bed, comprising:

a plurality of planks, each plank having an upper surface, a lower surface, and first and second opposing edges, each first edge configured to interlock with the second edge of another plank, the first edge of each plank having at least one first hook member and the second edge of each plank having at least one second hook member, the at least one second hook member configured to engage with the at least one first hook member of another plank so that the plurality of planks can be coupled together via their interlocking edges to form a deck body that extends across at least a portion of the cargo bed. The deck system may further comprise a rail assembly configured to be coupled to side rails of the cargo bed and to the deck body for supporting the deck body above the cargo deck.

BRIEF DESCRIPTION OF THE DRAWINGS

The drawings included herewith are for illustrating various examples of methods and apparatus of the present specification and are not intended to limit the scope of what is taught in any way. In the drawings.

DETAILED DESCRIPTION

Figure 1:
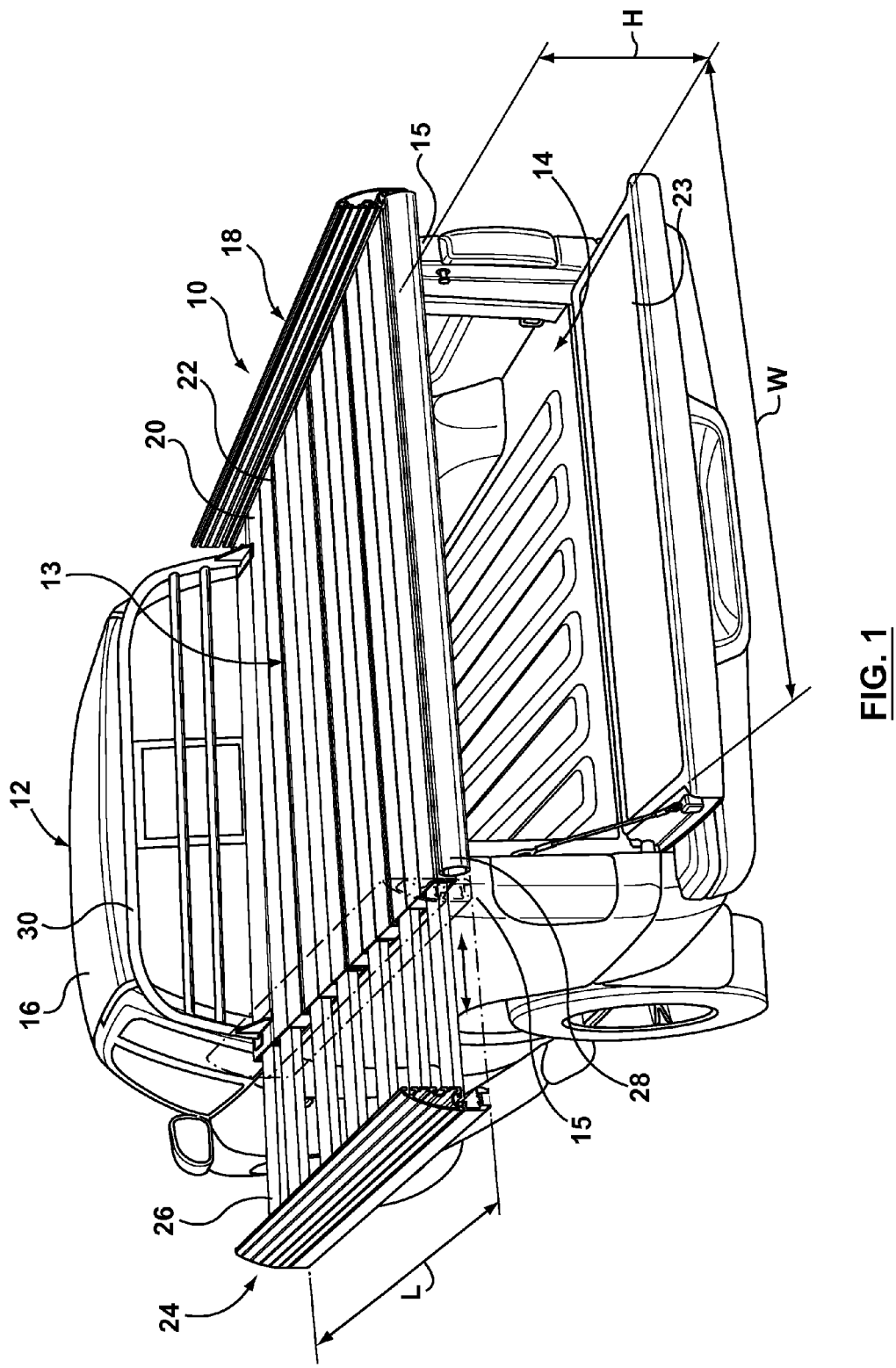
FIG. 1 is a rear perspective view of a modular deck system according to one embodiment mounted on a pickup truck.

Turning now to FIG. 1, illustrated therein is a modular deck system 10 according to one embodiment. The deck system 10 is configured to be mounted to a vehicle 12, such as a pickup truck (as shown), or another similar vehicle, that has a cargo bed 14 thereon.

The cargo bed 14 has side rails 15 that extend upwardly from the floor 17 of the bed 14, and generally has a bed width W, a bed length L, and a bed height H. As shown, a tailgate 23 is hingedly coupled to the vehicle 12 near the rear end of the bed 14 and can be used for closing off the end of the bed 14 to help secure cargo therein. This vehicle 12 also includes a cab 16 where the driver and passengers can sit when the vehicle 12 is in use.

As shown in FIGS. 1 to 6 and 10, the deck system 10 includes a deck body 18 that generally covers at least a portion of the floor 17 of the cargo bed 14. The deck body 18 is supported by and coupled to the bed 14 using a rail assembly 31, as will be described in greater detail below.

The deck body 18 is formed of a plurality of interlocked or interconnected planks, and can include one or more main planks 20 and one or more secondary planks 22. Generally, the number of main planks 20 and secondary planks 22 can be selected so as provide the deck body 18 with a desired length, allowing the deck body 18 to be customized for use with cargo beds 14 of various sizes.

In some embodiments some of the planks 20, 22 may have capture channels 50 that may be used to mount or secure items to the deck body 18. For example, as shown the deck body 18 has a headache rack 30 mounted to the upper surface 13 of the deck body 18 adjacent the cab 16. The capture channels 50 may also be used to mount the deck body 18 to the rail assembly 31, and the rail assembly 31 to the bed 14 as will be described in greater detail below.

As shown, in some embodiments, the deck system 10 may include one or more slider assemblies 24 provided along on the sides of the deck body 18. Each of the slider assemblies 24 may have a portion that extends upwardly from the upper deck surface 13 so as to help to inhibit objects from sliding off the sides of the deck surface 13.

The slider assemblies 24 may be configured to be extendable using slider members 26 that are received in apertures 21 in the main planks 20. In some cases, by extending the slider assemblies 24, the effective area of the deck surface 13 may be increased. This may allow more cargo can be supported by the deck surface 13.

In other embodiments, the deck system 10 may be provided without slider assemblies 24. Furthermore, in some embodiments the deck system 10 may include rigid sidewalls that are coupled to the deck body 18 that extend upwardly from the side edges of the deck surface 13 but which are not extendible.

In some embodiments, the deck body 18 may also have a ramp-mounting member 28 coupled thereto (and which may be a generally cylindrical tube as shown). The ramp-mounting member 28 may be configured to securely engage with a ramp, stairs, or another device so that objects can be loaded onto the deck surface 13.

For example, the ramp-mounting member 28 may be used with a telescoping ramp similar to that as generally described in U.S. Pat. No. 7,302,725 (Thygesen) which has locking hooks and can engage the ramp-mounting member 28, which may allow vehicles such as snowmobiles and all-terrain vehicles to be driven onto the deck surface 13 for transportation and storage.

In some embodiments, the ramp-mounting member 28 may be secured to the rear of the deck body 18 using one or more beams 29. The beams 29 may be coupled to one of the secondary planks 22 generally using a capture channel 50, as will be discussed below with reference to FIG. 14.

In some embodiments, one or more ramp-mounting members 28 may be provided along one or more sides of the deck body 18.

In some embodiments, a ramp carrier may be provided on the underside of the deck body 18, and which may be used to store the ramp when not in use. In some embodiments, various other cargo storage and restraint systems may be provided on the underside of the deck body 18 for transporting and securing cargo.

Figure 2:
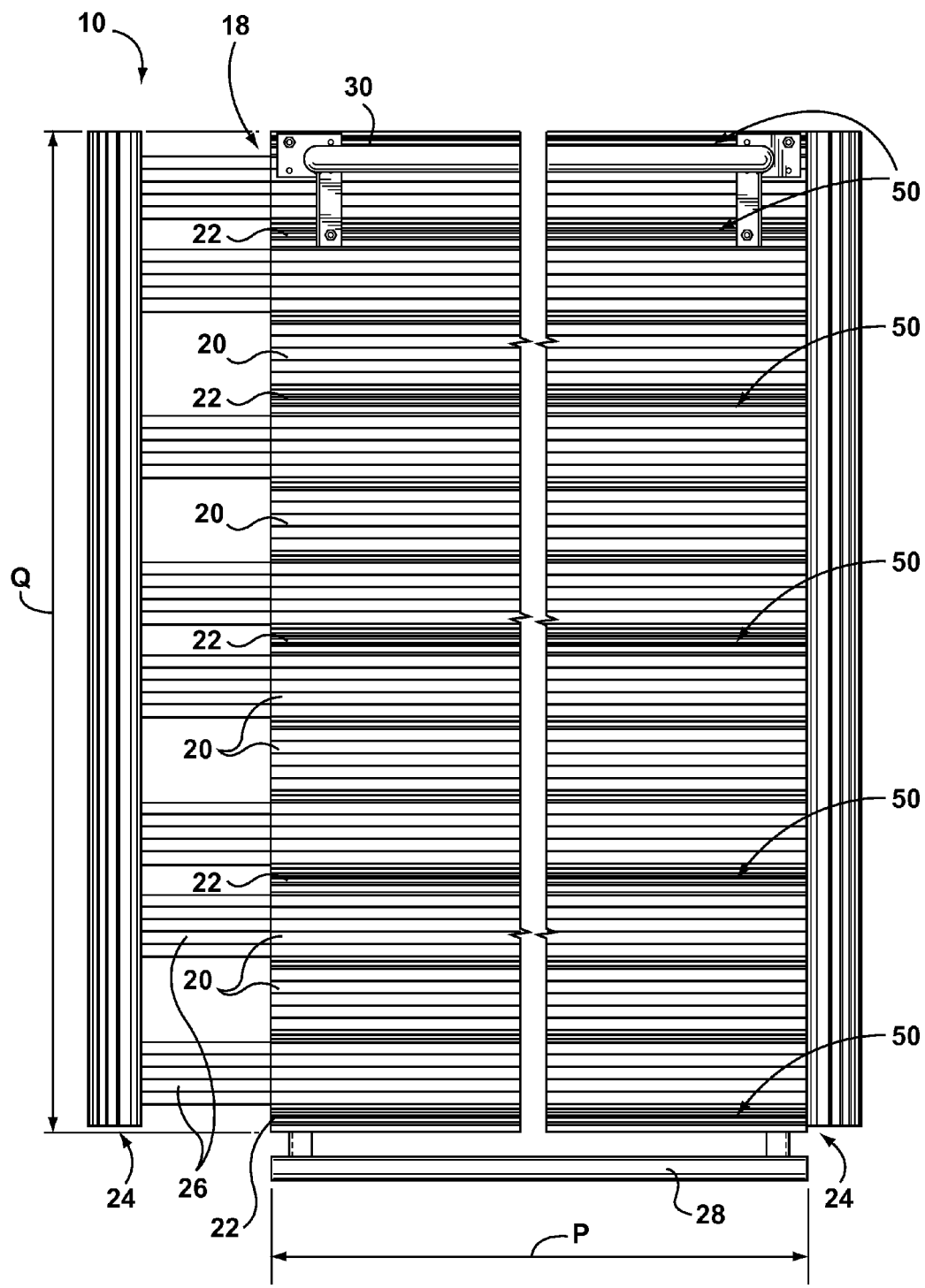
FIG. 2 is a plan view of the deck body of the deck system shown in FIG. 1.
Figure 3:
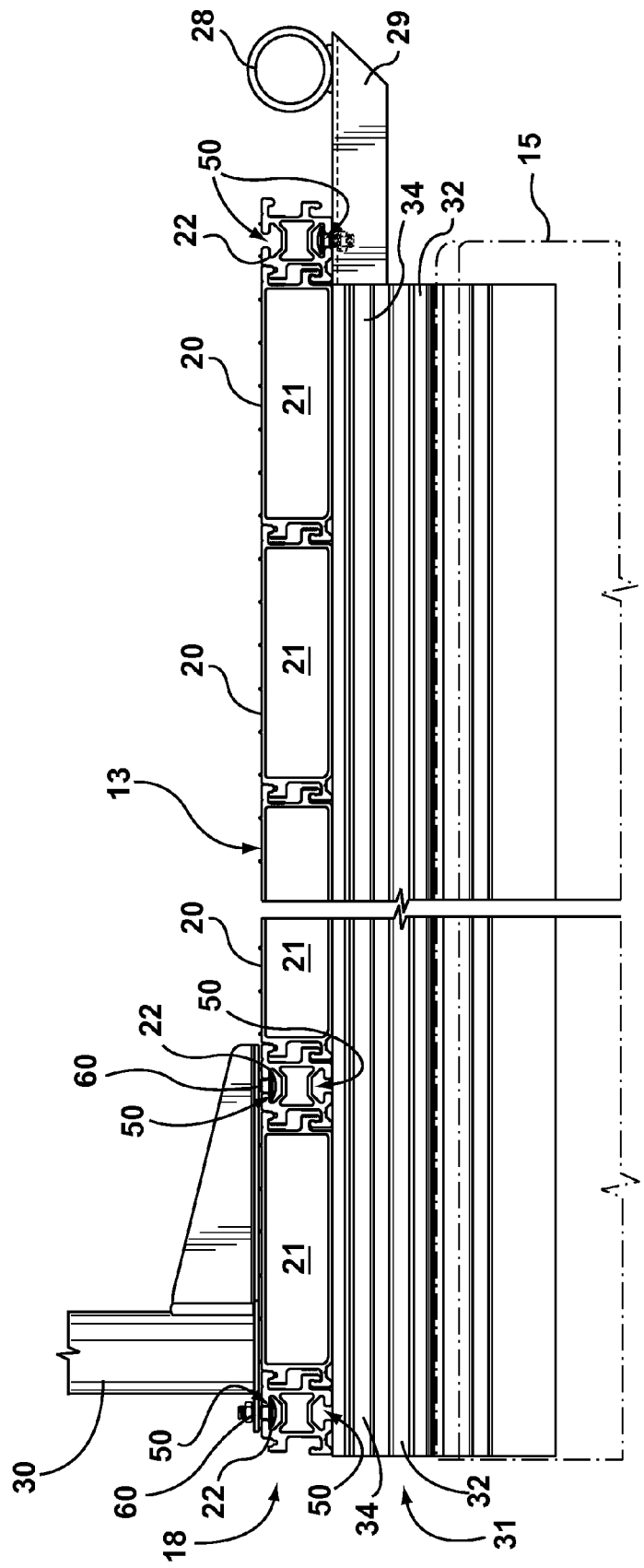
FIG. 3 is a side view of the deck body and rail assembly of the deck system shown in FIG. 1.
Figure 4:
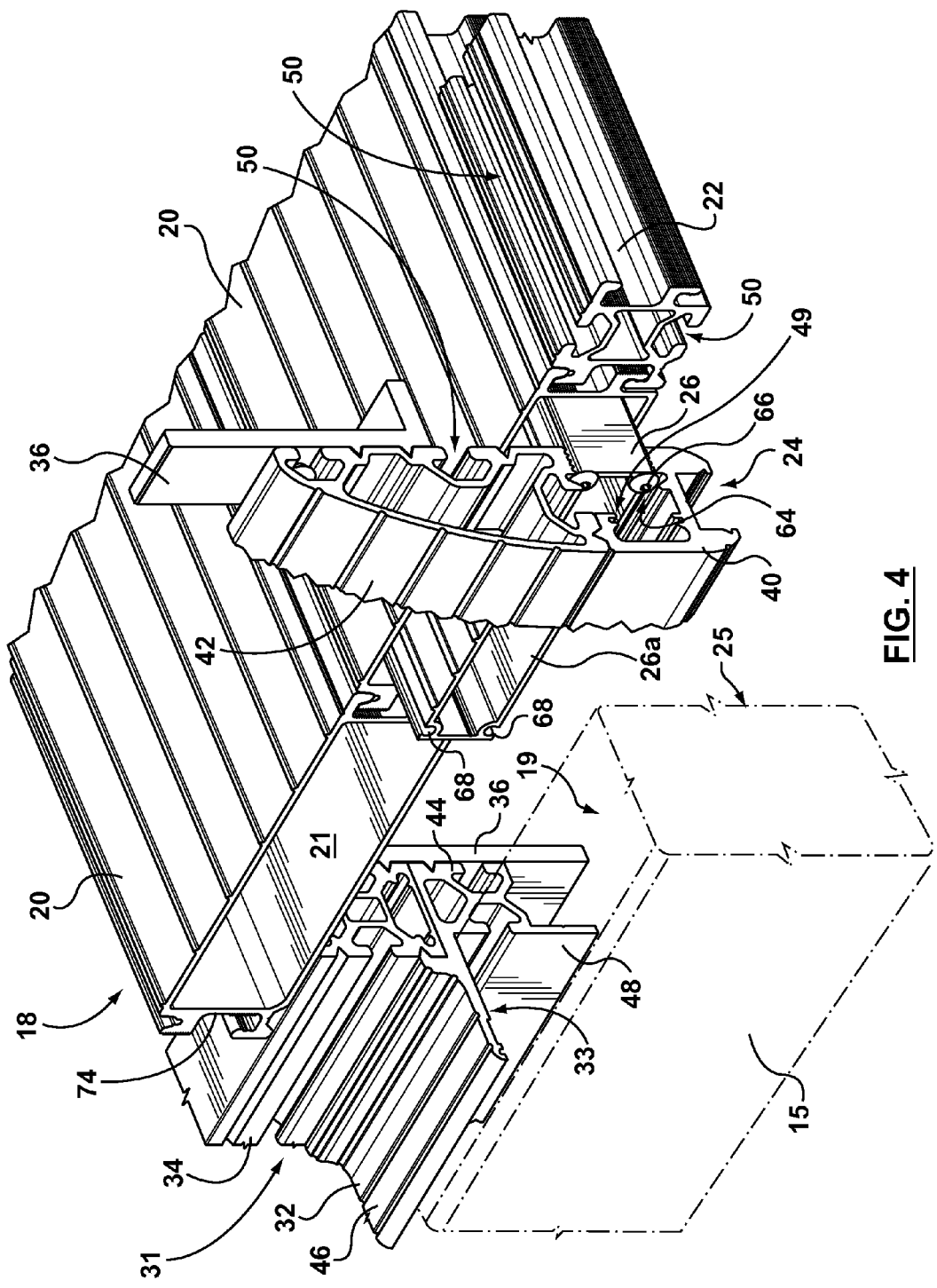
FIG. 4 is a partial broken view of the structural members of the deck body and rail assembly of FIG. 1 shown in greater detail.

Turning now to FIG. 2, the deck body 18 is shown in plan view having a deck width P and a deck length Q.

Generally, the deck width P and deck length Q may be selected to be at least as great at the bed width W and bed length L so that the deck body 18 covers the entire floor 17 of the bed 14. However, in other embodiments, the deck length Q may be less than bed length L so that the floor 17 of the cargo bed 14 is partially open. Similarly, the deck width P may be less than the bed width W (however, this may require the use of additional support members, such as legs, since the deck body 18 will not be directly supported by both side rails 15 of the vehicle 12).

The deck width P and deck length Q are generally determined by the selection and configuration of the planks 20, 22. For example, a suitable combination of main planks 20 and secondary planks 22 can be coupled together to generally obtain a desired deck length Q. This may be further facilitated when the main planks 20 and secondary planks 22 have different planks widths.

In some embodiments the planks 20, 22 can be manufactured or otherwise provided with a length that corresponds to the desired deck width P. This length may be determined according to the size and shape of the particular cargo bed 14.

In other embodiments, the planks 20, 22 may be manufactured or otherwise provided at standard lengths that can be subsequently modified to obtain the desired deck width P.

For example, the planks 20, 22 may be manufactured to have a length greater than 70 inches (e.g. to accommodate cargo beds on full sized trucks where the bed width W is about 70 inches) but can be cut to shorter lengths for use with cargo beds 14 having smaller bed widths W.

In this manner, the deck width P and the deck length Q of the deck body 18 can generally be customized for use with cargo beds 14 of various different shapes and sizes generally without the need for customized components to be designed for different sizes of cargo bed 14.

Turning now to FIGS. 3 to 6, as shown the deck body 18 is generally supported on the side rails 15 of the cargo bed 14 using a rail assembly 31.

As shown, the rail assembly 31 includes a pair of rail capture member 32, each configured to be supported by one of the side rails 15 of the vehicle. The rail assembly 31 also includes one or more rail sections 34 that elevate the deck body 18 above the rail capture members 32, as will be described in greater detail below.

Each rail capture member 32 generally includes an elongate main body portion 44 that extends along at least a substantial portion of the bed length L. The body portion 44 has an elongate mounting flange 46 configured to extend outwardly therefrom. Generally, this mounting flange 46 allows at least a portion of the weight of the deck body 18 and rail assembly 31 to be carried by the side rails 15 of the vehicle 12. In particular, each mounting flange 46 has a lower engaging face 33 that extends along and is supported by a substantial portion of the upper surface 19 of the side rail 15 when in use.

Figure 6:
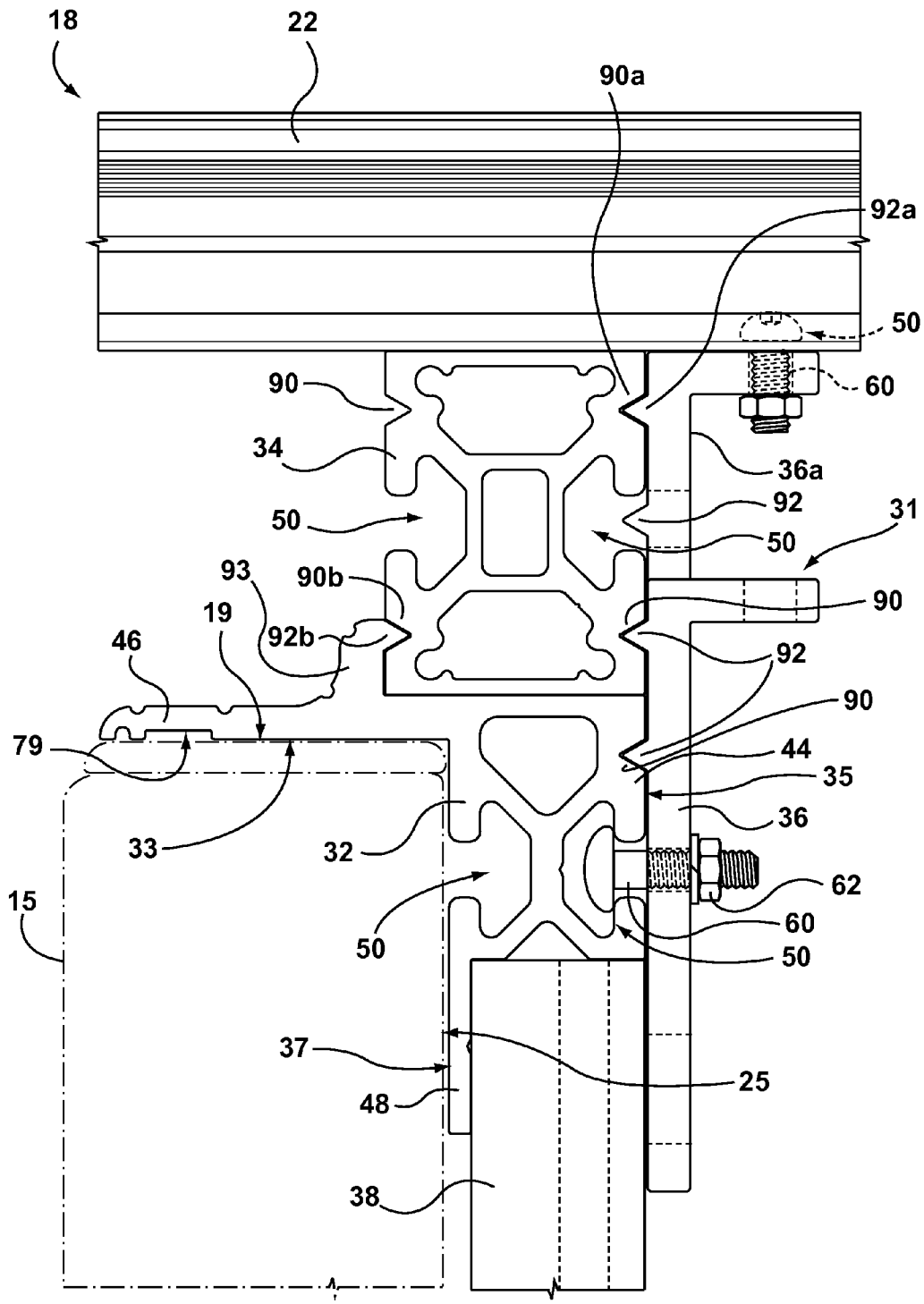
FIG. 6 is an end view of the rail assembly of the deck system of FIG. 1.

Each rail capture member 32 may also have a lower flange 48 configured to extend downwardly from the main body portion 44. The lower flange 48 has an outer face 37 generally configured to abut the inner surface 25 of the side rail 15 (as shown in FIG. 6) when the rail capture member 32 is mounted thereto.

The main body 44 of each rail capture member 32 may also include a plurality of capture channels 50 for securing objects to the rail capture member 32. For example, a capture channel 50 may be provided on an inner face 35 of the main body 44, and may be used to join one or more rail angles 36 thereto so as to secure one or more leg members 38 between the rail angles 36 and the lower flange 48.

Figure 5:
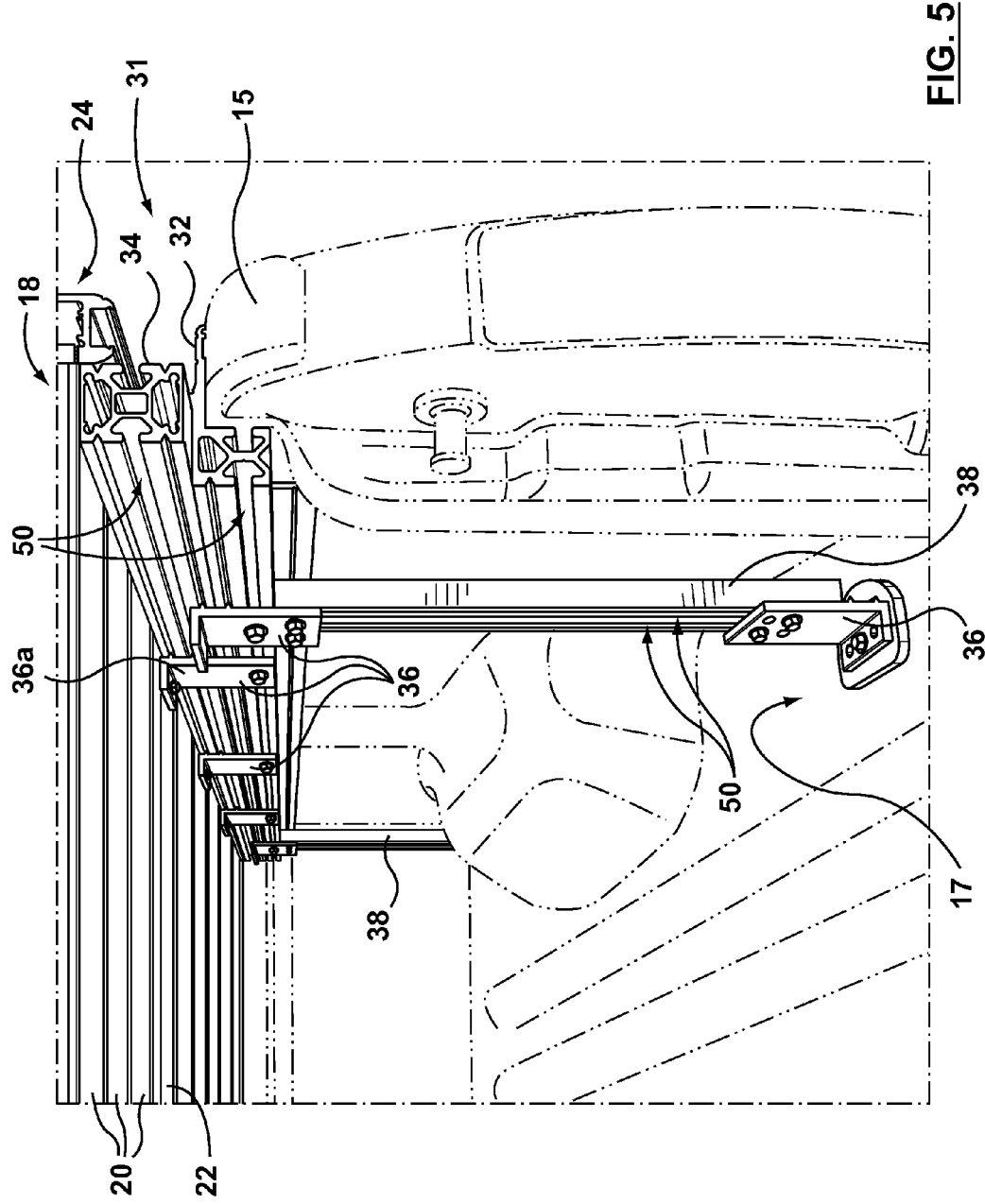
FIG. 5 is a rear perspective view of the underside of the deck body of FIG. 1 supported by the rail assembly.

Furthermore, as shown in FIG. 5, rail angles 36 may be used to couple the main body 44 to secondary planks 22 in the deck body 18 using capture channels 50, so as to secure the deck body 18 to the rail assembly 31.

In some embodiments, each rail capture member 32 may be fastened to one of the side rails 15 (e.g. using bolts or screws that extend though the mounting flange 46 and/or the lower flange 48, for example) so that the deck body 18 is rigidly coupled to the side rails 15.

In other embodiments, the rail capture members 32 can be secured to the side rails 15 without bolts or screws. For example, the rail capture members 32 could be clamped to the side rails.

In some embodiments, the mounting flange 46 may include a recessed portion 79 offset from the upper surface 19 of the side rails 15. The recessed portion 79 may allow a gasket or other sealing device to be provided between the mounting flange 46 and the side rails 15 so as to help facilitate a water-tight seal therebetween.

As introduced above, the rail assembly 31 also includes rail sections 34. Each rail section 34 generally has an elongate body that may also extend along at least a substantial portion of the bed length L and may assist in supporting the deck body 18 (particularly where the deck body 18 extends beyond the ends of the side rails 15 in a cantilevered manner).

The rail sections 34 generally define side-walls underneath the deck body 18, and elevate the deck body 18 above the rail capture members 32. For example, the rail sections 34 may elevate the deck body 18 over the tailgate 23 to avoid interference between the tailgate 23 and the deck body 18.

In some embodiments, two or more rail sections 34 may be stacked on top of each other (and on top of the rail capture member 32) so as to further raise the deck body 18 about the floor 17 of the bed 14. This may be advantageous to allow for more interior cargo space beneath the deck body 18.

The rail sections 34 also tend to provide a seal between the deck body 18 and the side rails 15 so as to protect the interior of the bed 14, which may be useful as to provide theft-resistance, weather-resistance and dust-resistance for the cargo bed 14.

In some embodiments, front and rear end members may be provided to further seal the deck body 18 and enclose the cargo bed 14 (as will be described in greater detail below with respect to FIGS. 15 and 16).

As shown, each rail section 34 may include a plurality of grooves 90 that extend along the length of the rail section 34 on opposite sides thereof.

For example, the grooves 90b may cooperate with ridges 92b provided in the rail capture members 32 and the rail angles 36 so as to secure the rail sections 34 to the rail capture members 32.

For example, as shown in FIG. 6, a first rail angle 36a may be used to couple the rail capture member 32 to a secondary plank 22 in the deck body 18. When so coupled, a first groove 90a in the rail section 34 may engage a first ridge 92a on the first rail angle 36a, while a second groove 90b on the opposite side of the rail section 34 engages a second ridge 92b on an upwardly extending arm 93 on the rail capture member 32, thus securing the rail section 34 to the rail capture member 32.

The grooves 90 and ridges 92 generally have complementary shapes. In some embodiments, the grooves 90 and ridges 92 may be V-shaped, as shown. In other embodiments, the grooves 90 and ridges 92 may have other suitable shapes, such as hemispherical cross-sections, and so on.

Each rail section 34 may also include one or more capture channels 50. In some embodiments, one or more rail angles 36 may be secured to the capture channels 50 in the rail section 34 and to another capture channel 50 in a secondary plank 22 of the deck body 18 so as to couple the rail section 34 directly to the deck body 18.

In some embodiments, the deck body 18 and rail assembly 31 may be further supported by one or more leg members 38 that extend downwardly from the rail assembly 31. For examples, as shown in FIGS. 5 and 6, one or more rail angles 36 may be joined to the rail capture members 32 so as to secure one or more leg members 38 between the rail angles 36 and the lower flange 48.

Generally, the leg members 38 may be used to transfer at least some of the weight of the deck body 18 and rail assembly 31 to the floor 17 of the bed 14 so that less than the entire load is carried by the side rails 15.

As shown, the leg members 38 may have one or more capture channels 50 extending along the longitudinal length thereof. In some embodiments, rail angles 36 may be used to couple the leg members 38 to the floor 17 of the bed 14 by securing the rail angles 36 to the capture channels 50 on the leg members 38.

The capture channels 50 in the leg members 38 may also provide for adjustable bolted connections to allow the leg members 38 to also be used for mounting cargo control systems and other accessories below the deck body 18.

Generally, the rail angles 36 may serve as common connecting members for joining the rail capture members 32, rail sections 34 and leg members 38 together and to the deck body 18 and the bed 14.

Figure 7:
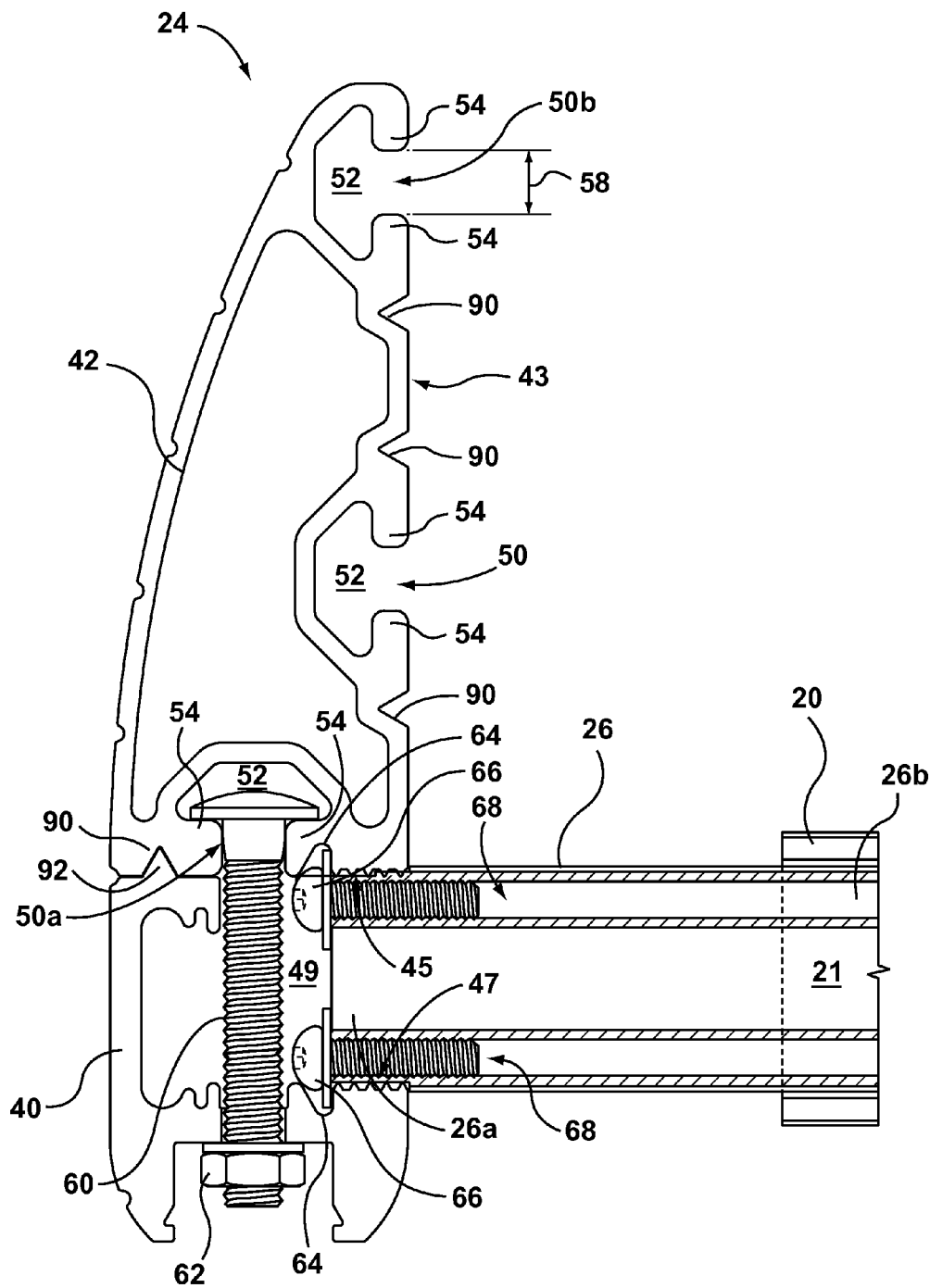
FIG. 7 is an end view of a slider assembly of the deck system of FIG. 1.

Turning now to FIG. 7, the slider assembly 24 is shown in greater detail. As described above, the slider assemblies 24 are configured to be extendable so as to increase the effective area of the deck surface 13.

Each slider assembly 24 generally includes one or more slider members 26, each having a first end 26a and a second end 26b opposite the first end 26a, with the second end 26b configured to be slidably received in the aperture 21 of one of the main planks 20.

Each slider assembly 24 also includes a lower side member 40, which is generally elongate and extends along at least a substantial portion of the deck length Q (as seen in FIG. 2).

Attached to the lower side member 40 is a corresponding upper side member 42. The upper side member 42 generally extends upwardly above the upper deck surface 13 and has an inner face 43 that serves as a barrier so as to help to inhibit objects from sliding off the sides of the deck surface 13 when the vehicle is in use. The inner face 43 may also include one or more capture channels 50 for mounting accessories and other objects to the upper side member 42 of the slider assemblies 24.

As shown, the upper side member 42 generally has a first engaging surface 45 on a lower portion thereof, while the lower side member 40 has a second engaging surface 47 on an upper portion thereof, generally opposite the first engaging surface 45. The first and second engaging surfaces 45, 47 define an elongate channel 49 therebetween that is sized and shaped to receive the first ends 26a of the slider members 26. In particular, when the lower and upper side members 40, 42 are coupled together (e.g. using capture channel 50a and fastener 60), the first and second engaging surfaces 45, 47 cooperate so as to squeeze the first ends 26a of the slider members 26 so as to secure the first ends 26a within the channel 49.

Generally, since the channel 49 is elongate and runs the length of the lower and upper side members 40, 42, slider members 26 can be provided at various locations along the length thereof. Accordingly, the slider members 26 can be positioned within the channel 49 at locations that correspond to the locations of the main planks 20 in the deck body 18, thus accommodating the various configurations that are possible for the deck body 18.

In some embodiments, the first and second engaging surfaces 45, 47 may have ridges or other friction enhancing features so as to further facilitate gripping the first ends 26a of the slider members 26 within the channel 49.

In some embodiments, the lower and upper side members 40, 42 may have elongate grooves 64 therein for receiving the heads of fasteners 66 (e.g. screws, etc.) that may be coupled to screw-bosses 68 in the first ends 26a of the slider rails 26. The grooves 64 and fasteners 66 may cooperate to further secure the slider rails 26 to the lower and upper side members 40, 42.

Still referencing FIG. 7, the structure and operation of the capture channels 50 will be further described. Generally, each capture channel 50 may extend along at least a portion of the length of one of the structural members so that fasteners (e.g. bolts, etc.) can be coupled thereto at various locations. For example, each secondary plank 22 includes a pair of opposing capture channels 50 on the upper and lower surfaces thereof, and which allow accessories and other items to be mounted to the secondary plank 22 at various locations along its length.

With specific reference to FIG. 7, each capture channel 50 (e.g. capture channels 50a, 50b) may include a recessed portion 52 into which the head of a fastener 60 (e.g. bolts, screws, etc.) can be received. Each capture channel 50 also includes a pair of opposing flanges 54 that extend inwardly towards each other. The flanges 54 have inner engagement surfaces 56 thereon within the recessed portion 52 for engaging with the head of the fastener 60. The flanges 54 also define a narrow opening 58 through which the shank of the fastener 60 can extend, so that the fastener can be coupled using a nut 62.

Since each capture channel 50 may extend along at least a substantial portion of the longitudinal length of a structural member, significant flexibility in adjusting the location of various fasteners therein is provided.

This flexibility can be particularly useful for securing the members 32, 34 of the rail assembly 31 together, securing the deck body 18 to the rail assembly 31, securing the rail assembly 31 and the leg members 38 to the floor 17 of the bed 14, and securing accessories 30 (e.g. a headache rack, etc.) at a virtually unlimited number of locations on the deck system 10.

When the deck system 10 is assembled for a particular vehicle 12, various holes may be drilled in some other structural members to provide apertures opposite the capture channels 50 as desired. For example, holes may be drilled at various locations in the lower side member 40 to secure the lower side member 40 to the upper side member 42 using the fastener 60 in the capture channel 50a. In some embodiments, one or more holes can also be pre-drilled, for example according to desired configurations of the deck system 10.

Figure 8:
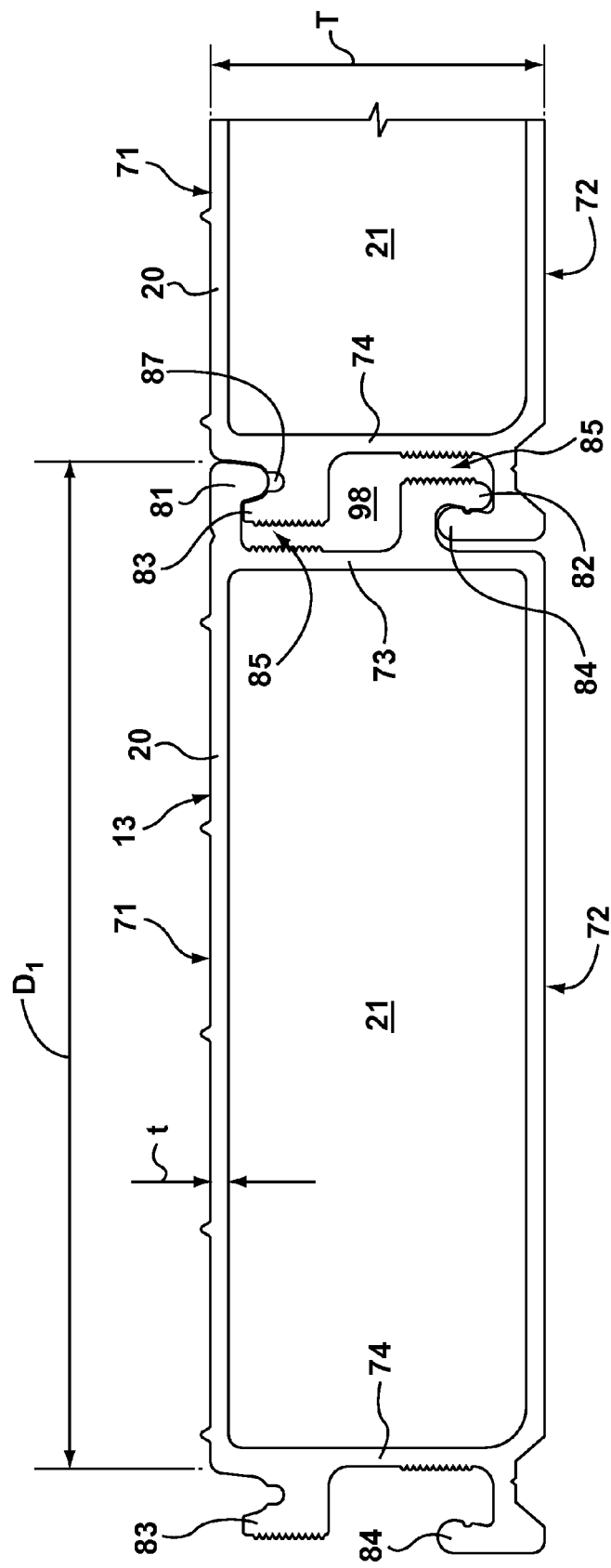
FIG. 8 is an end view of two main planks joined together.

Turning now to FIG. 8, two main planks 20 are shown coupled together. As described above, a plurality of main planks 20 and intermediate planks 22 can be selected and coupled together to form the deck body 18 having a desired deck length P.

As shown, each main plank 20 generally has an upper surface 71 (and which is generally part of the upper deck surface 13), a lower surface 72 opposite the upper surface 71, a first edge 73 between the upper and lower surfaces 71, 72, and a second edge 74 generally opposite the first edge 73.

Each main plank 20 may have a main plank width $D_1$ (e.g. between the first and second edges 73, 74) and have a plank thickness T (e.g. between the opposing upper and lower surfaces 71, 72)

In some embodiments, the main plank width $D_1$ is between 3 inches and 18 inches. In other embodiments, the main plank width $D_1$ is between 6 inches and 12 inches. In yet other embodiments, the main plank width $D_1$ is less than 6 inches.

In some embodiments, the plank thickness T is between 0.5 inches and 3 inches. In other embodiments, the plank thickness T is between 1 inches and 2 inches. In yet other embodiments, the plank thickness T is less than 3 inches.

As shown, in some embodiments, each main plank 20 is generally hollow so as to provide the aperture 21 for receiving the slider rails 26, with a wall thickness t. In some embodiments, the wall thickness t is between 0.125 inches and 0.5 inches. In other embodiments, the wall thickness t is between 0.25 inches and 0.325 inches.

Generally, each of the first and second edges 73, 74 of the main planks 20 are configured to interlock or interconnect with each other so that two or more main planks 20 may be securely coupled together.

For example, as shown the first edge 73 includes a first upper hook member 81 and a first lower hook member 82. The first hook members 81, 82 generally extend downwards towards the lower surface 72.

Conversely, the second edge 74 includes a second upper hook member 83 and a second lower hook member 84. The second hook members 83, 84 generally extend upwards towards the upper surface 71, and are sized and shaped to be engaged with the first hook members 81, 82.

In some embodiments, the hook members 81, 82, 83, 84 are configured to fit snuggly together so that when two planks 20 are engaged using the hook members 81, 82, 83, 84 they will be rigidly coupled together. In other embodiments, the hook members 81, 82, 83, 84 are configured to fit loosely together.

Figure 11:
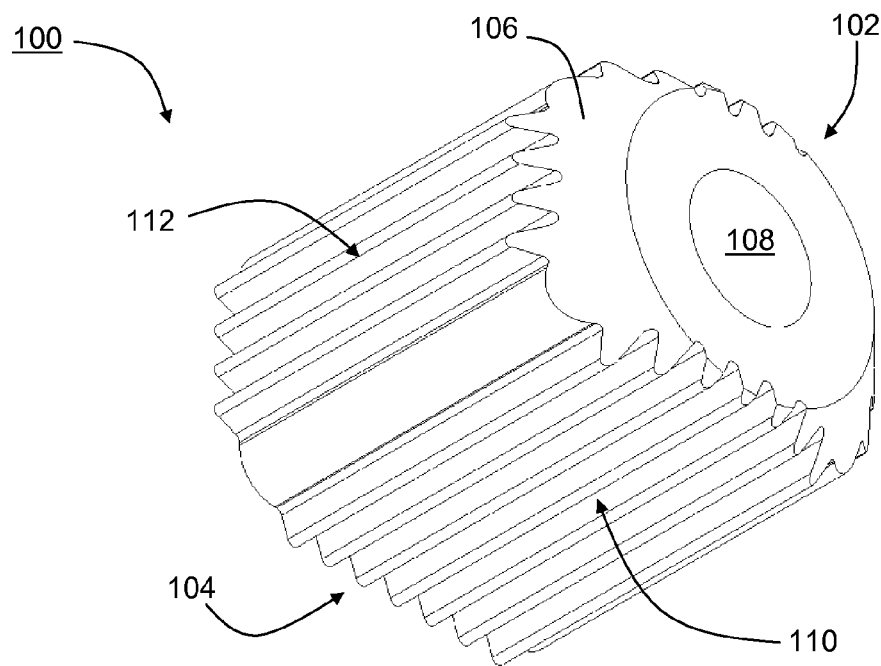
FIG. 11 is a perspective view of a wedge for securing two planks together according to one embodiment.
Figure 12:
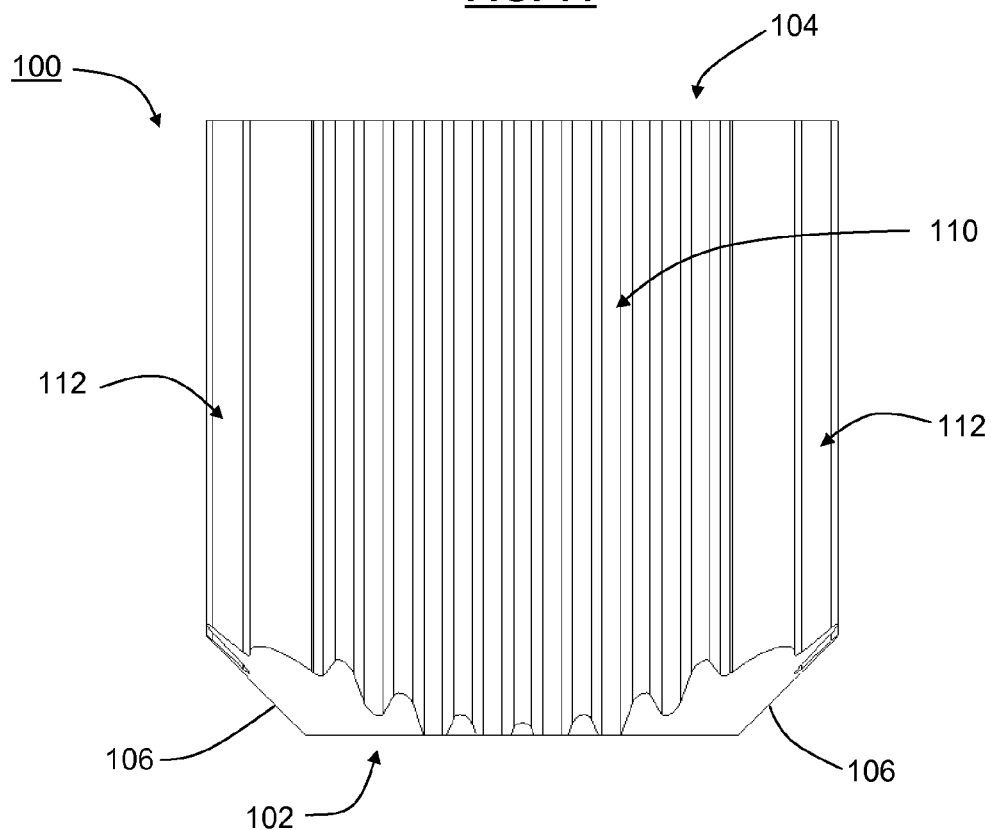
FIG. 12 is an top view of the wedge of FIG. 11.
Figure 13:
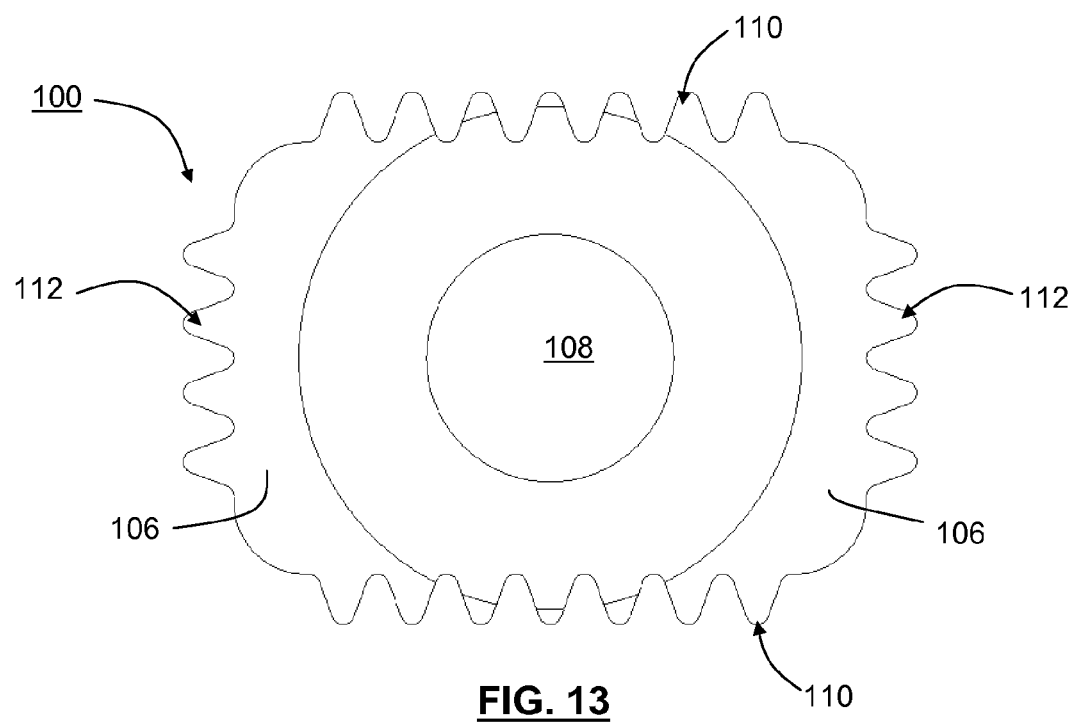
FIG. 13 is a front view of the wedge of FIG. 11.

In some embodiments, and additional fasteners may be used to rigidly couple the main planks 20 together. For examples, some of the hook members 81, 82, 83, 84 may have ridges thereon that cooperate to define screw-capture regions 85 when two or more planks 20 are coupled together. Screws or other fasteners can be provided in the screw capture regions 85 to couple the planks 20 together. In some embodiments, one or more wedges may be used to secure the planks together (e.g. the wedge 100 as shown in FIGS. 11 to 13 below).

In some embodiments, one or more channels 87 may be provided in the second upper hook member 83. The channels 87 may be provided with a gasket or other sealing device therein so as to further assist in forming a watertight seal between hook members 81, 83 so as to inhibit water from passing between the planks 20.

Figure 9:
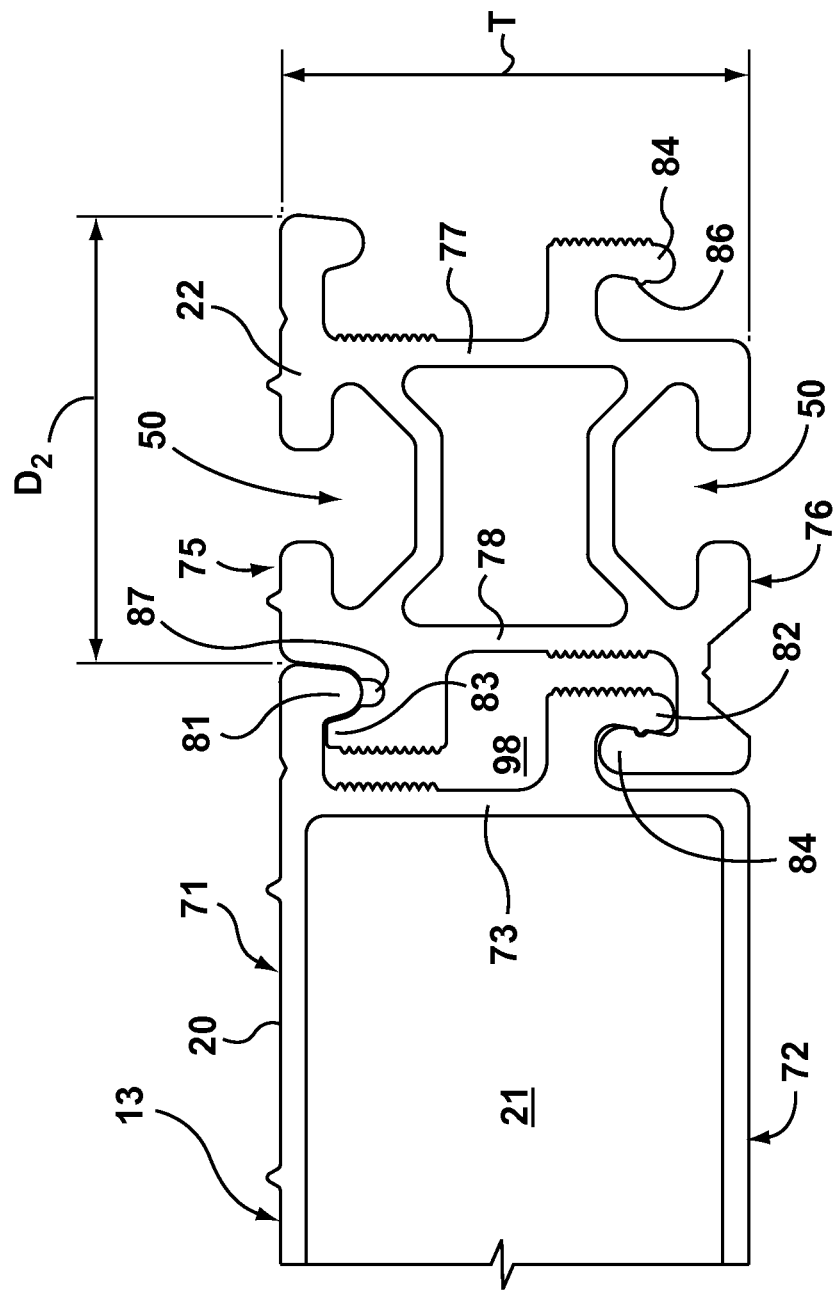
FIG. 9 is an end view of a main plank and a secondary plank joined together.
Figure 10:
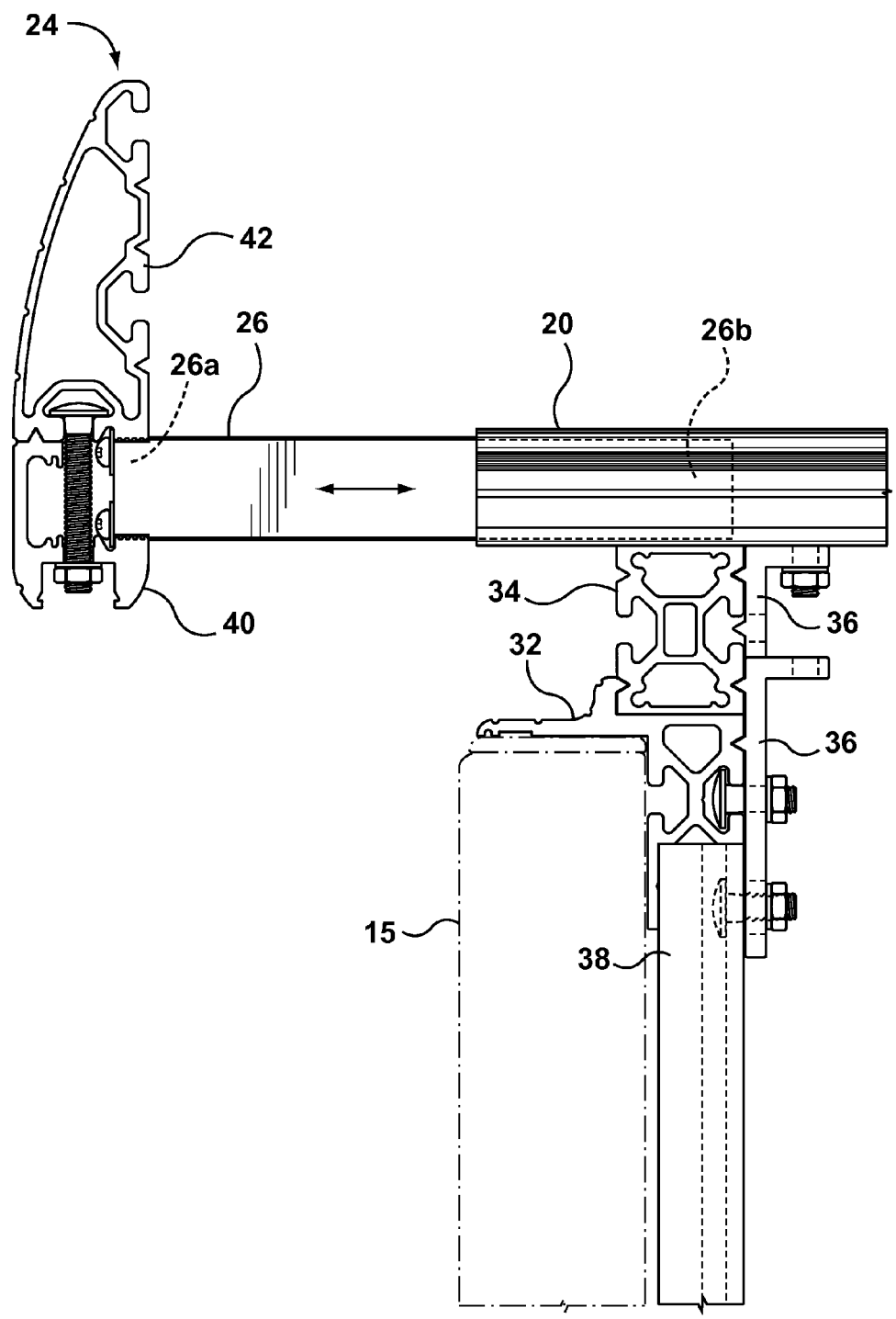
FIG. 10 is a partial end view of the deck system of FIG. 1.

Turning now to FIG. 9, a main plank 20 and a secondary plank 22 are shown coupled together.

Each secondary plank 22 generally includes an upper surface 75, a lower surface 76 opposite the upper surface, and opposing first and second edges 77, 78.

Each secondary plank 22 may have a secondary plank width $D_2$ (e.g. between the first and second edges 77, 78) and have a plank thickness T (e.g. between the opposing upper and lower surfaces 75, 76)

In some embodiments, the secondary plank width $D_2$ is between 1 inch and 2 inches. In other embodiments, the secondary plank width $D_2$ is between 2 inches and 3 inches.

Generally, each secondary plank 22 is configured to be couplable to another secondary plank 22 and/or another main plank 20. For example, the secondary plank 22 as shown includes hook members 81, 82, 83 and 84 having the same configuration and coupling capabilities as generally described above.

As shown in FIG. 9, secondary plank 22 also includes opposing capture channels 50 provided in the upper surface 75 and the lower surface 76.

In some embodiments, the rail assembly 31 can be used without the deck body 18. In such embodiments, the rail assembly 31 will tend to function as a universal perimeter rail and leg mounting system for coupling objects thereto using the capture channels 50. For example, the rail assembly 31 generally forms a base onto which can be bolted a variety of cargo control systems and other accessories such as headache racks, ladder racks and various other work truck and recreational items.

Turning now to FIGS. 11 to 13, illustrated therein is a wedge 100 which may be used for securing two planks together. The wedge 100 has a leading end 102 and a trailing end 104.

The leading end 102 of the wedge 100 is configured so that the wedge 100 can be inserted into an opening 98 between two planks 20, 22 (e.g. the opening 98 located between the hooks 82, 83 as shown in FIGS. 8 and 9). The wedge 100 is normally slightly larger than the opening 98 so that as the wedge 100 is inserted, it will push outwardly on the hooks 82, 83 so as to tend bind the planks 20, 22 together.

In particular, the leading end 102 may include one or more tapered portions 106 that is slightly smaller than the opening 98 which tend to allow the wedge 100 to be received in the opening 98. The wedge 100 can then be driven into the opening 98 (e.g. using a hammer to impact the trailing end 104 or pneumatically using a drive pin tool), so that the body of the wedge 100 biased the hooks 82, 83 apart.

In some embodiments, the wedge 100 may also include a central opening 108, which may be sized and shaped to receive a fastener (e.g. a #10 bolt).

In some embodiments, the wedge 100 can includes ridges along one or more of the sides. For example, ridges 110 are shown provided on the longer sides of the wedge 100 and other ridges are provided on the shorter sides of the wedge 100. The ridges 110, 112, may further facilitate the binding of the planks 20, 22. In particular, the ridges 110, 112 may be configured to bite into the hooks 82, 83 so as to encourage securing the planks 20, 22 together.

In some embodiments, one or more portions of the wedge 100 may be made of a malleable material (e.g. aluminum), which can undergo deformation when the wedge 100 is inserted into the opening 98. For example, the ridges 110, 112 may be made of aluminum and may undergo plastic deformation when the wedge 100 is inserted into the opening 98 so as to facilitate securing the planks 20, 22 together.

Generally, using one or more wedges 100 may inhibit the need to use pre-drilled holes, fasteners, and the associated labor. The wedges 100 may also reduce or eliminate the need to use rubber seals, sealants and/or gaskets to inhibit leaks.

In particular, the planks 20, 22 may be configuration to be self-draining when they are joined. Water in the planks 20, 22 will tend to drain down to the top groove, and if it flows past this point it works its way down to the bottom of the extrusion, and then flow out to the open ends. Since the wedge 100 tends to eliminate the fasteners and associated penetrations (which could have interfered with the water flow), potential leak points are eliminated.

Figure 14:
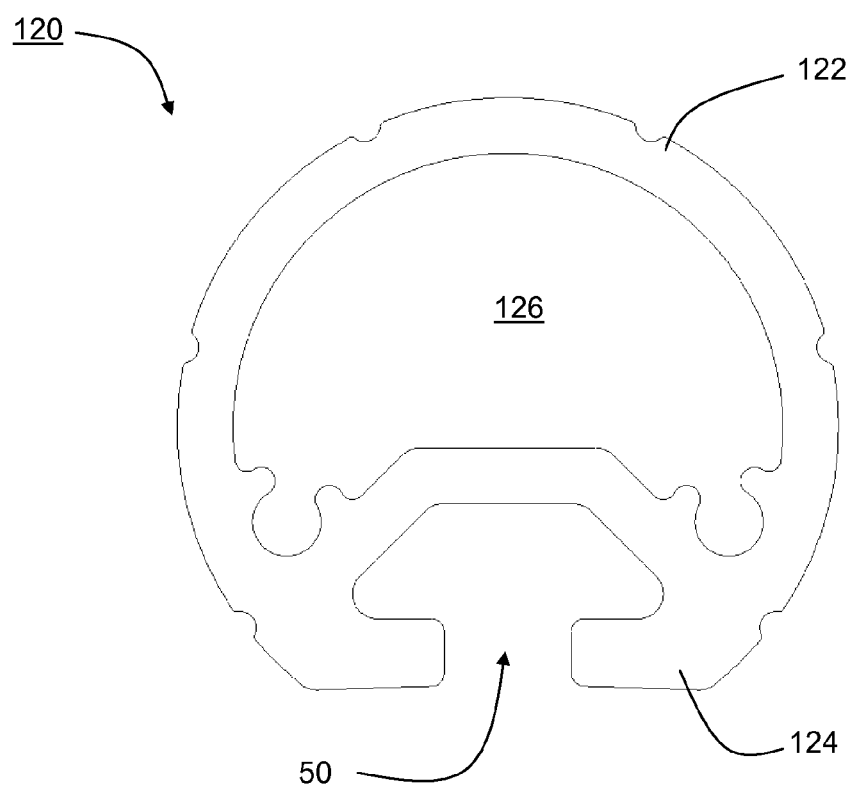
FIG. 14 cross-sectional view of a ramp-mounting member according to one embodiment.

Turning now to FIG. 14, illustrated therein is a ramp-mounting member 120 according to one embodiment. Generally, this ramp-mounting member 120 may be used in place of the ramp-mounting member 28 described above (e.g. for securing a ramp to the deck body 18).

As shown, the ramp-mounting member 120 includes a generally cylindrical or tubular body 122 (shown here in cross-section) and has a lower portion 124. The ramp-mounting member 120 may have a hollow interior 124 (as shown), or may be solid.

The ramp-mounting member 120 also includes a capture channel 50 in the lower portion 124 thereof. The capture channel 50 can be used to mount the ramp-mounting member 120 to the deck system 10 as desired.

Figure 15:
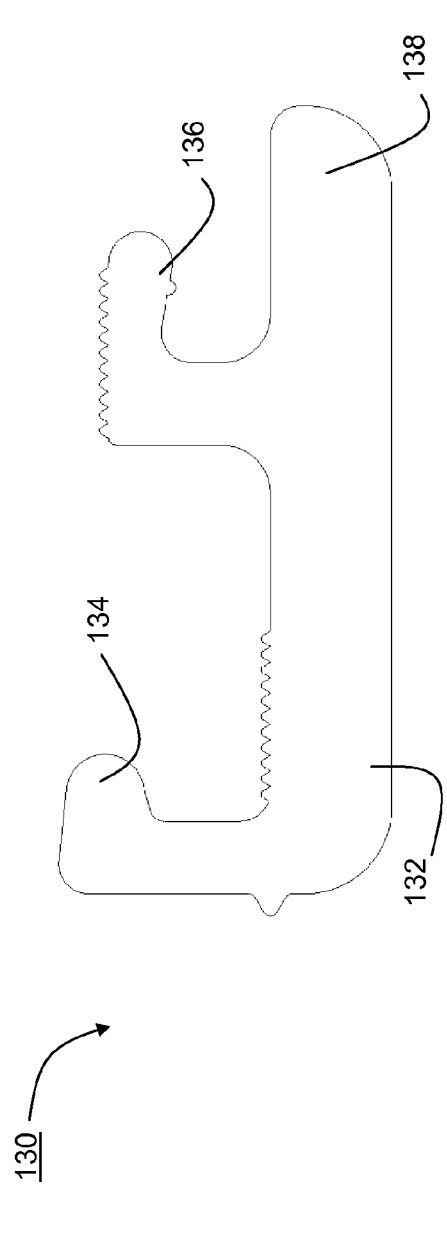
FIG. 15 is a sectional view of a rear end member for the deck system of FIG. 1.

Turning now to FIG. 15, illustrated therein is a rear end member 130. The rear end member 130 may be secured to one of the planks 20, 22 to define a rear end of the deck body 18.

The rear end member 130 generally includes a body 132, a first hook member 134 configured to interlock with a hook member on one of the planks (such as hook member 83 on a secondary plank 22), and a second hook member 136 configured to interlock with another hook member on that plank (e.g. hook member 84 on a secondary plank 22). The rear end member 130 also has a flange 138 that extends along the body so as to cover the plank (e.g. plank 22) in behind.

In some embodiments, the rear end member 130 may be used as the rearmost portion of the deck body 18 (e.g. at the further point from the cab 16).

Figure 16:
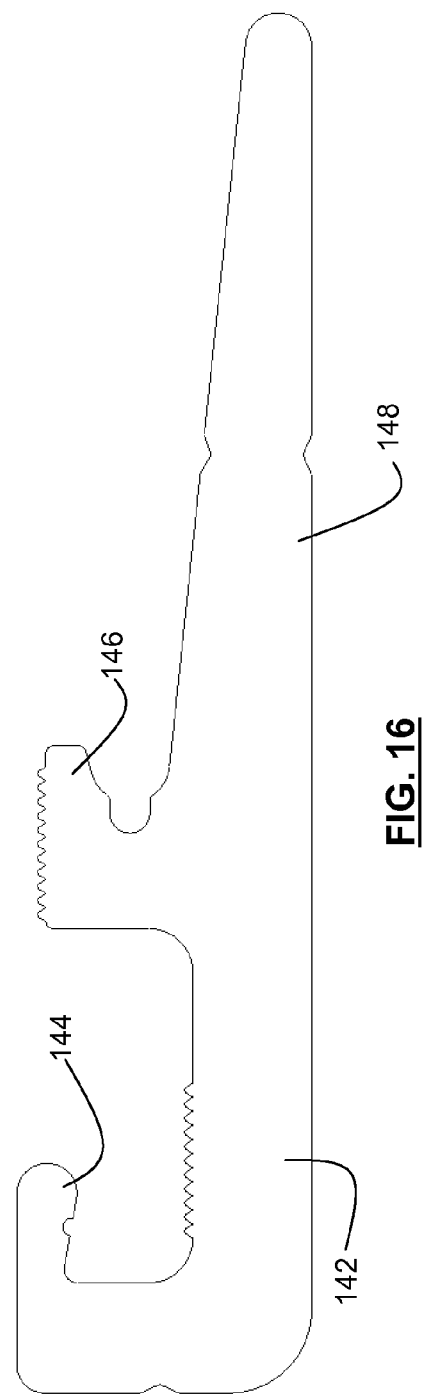
FIG. 16 is a sectional view of a front end member for the deck system of FIG. 1.

Turning now to FIG. 16, illustrated therein is a front end member 140. Similar to the rear end member 130, the front end member 140 may be secured to one of the planks 20, 22 to define a front end of the deck body 18.

The front end member 140 generally includes a body 142, a first hook member 144 configured to interlock with a hook member on one of the planks (such as hook member 82 on a main plank 20), and a second hook member 146 configured to interlock with another hook member on that plank (e.g. hook member 81 on a main plank 20). The front end member 140 also has a extended flange 148 that extends along the body so as to cover the plank (e.g. plank 20) and extend upwardly therefrom.

In some embodiments, the front end member 140 may be used as the forwardmost portion of the deck body 18 (e.g. at the point closest the cab 16), and the extended flange 148 tends to act as a "toeboard" to keep objects on the deck surface 13 from sliding forwards (e.g. into the cab 16). In some embodiments, the extended flange 149 may have one or more tie-holes therein for tying objects to the deck body 18.

In various embodiments, some or all of the structural members as generally described herein may be made of a metal, such as steel or aluminum. For example, some or all of the structural members may be manufactured as extruded aluminum components. In other embodiments, some or all of the structural members may be made of other suitable materials (e.g. rigid plastics, composites, etc.)

In some embodiments, some or all of the structural members of the deck system 10 may undergo a finishing process. For example, structural members may be anodized, powder coated, and/or provided with polished finish. Such finishes may tend to provide for a complete and polished appearance, and may further protect the deck system 10 from weather and other effects.

In some embodiments, the deck system 10 could be used for vehicle storage and transportation (e.g. snowmobiles, all-terrain vehicles, personal water craft (PWC), etc.). The deck system 10 could also be used for various loading and unloading operations, and may be used to transport objects on top of the deck surface 13 as well as to store objects (e.g. tools and toolboxes) below the deck body 18 in a generally secure manner (e.g. by locking the tailgate 23). The deck system 10 could also be used for portable stage and for exhibits, with equipment and the like provided on and/or below the deck surface 13.

In some embodiments, the deck system 10 can be used for various camping applications (e.g. the deck body 18 could be used as an elevated floor onto which another camping structure could be affixed, such as a tent) or for hunting applications (e.g. as a perch).

In some embodiments, one or more rigid sidewalls may be coupled to the upper deck surface 13 using capture channels 50 provided in the secondary planks 22.

In some embodiments, the lower surface of the deck body 18 includes capture channels 50 (e.g. provided in the secondary planks 22) and which may be used to form a base for an adjustable combination of under-deck attachments. For example, slide-out drawers or multiple drawer systems could be coupled to the lower surface of the deck body 18 and could allow use of the interior volume cargo bed 14 (e.g. between the floor 17 and the deck body 18).

In some embodiments, various lighting systems could be secured to the underside of the deck body 18 so as to more easily inspect objects in the cargo bed 14.

In some embodiments, the various structural members of the deck system 10 (e.g. the planks 20, 22, the rail capture members 32, the rail sections 43, etc.) can be flat-packed so as to facilitate shipping (e.g. using shipping cartons of configurations that are volumetrically efficient). Once at the desired destination (e.g. a dealer, a distributor, a consumer), the structural members can be easily assembled so as to provide the completed deck system 10.

While the above description provides examples of one or more methods and/or apparatuses, it will be appreciated that other methods and/or apparatuses may be within the scope of the present description as interpreted by one of skill in the art.

The invention claimed is:

1. A deck system for a vehicle having a cargo bed, comprising:
   a deck body that extends across at least a portion of the cargo bed, the deck body comprising a plurality of planks, each plank having:
   an upper surface,
   a lower surface, and
   first and second opposing edges, each first edge configured to interlock with the second edge of another plank,
   the plurality of planks being coupled together via their interlocking edges to form the deck body; and
   a rail assembly configured to be coupled to side rails of the cargo bed and to the deck body for supporting the deck body above the cargo bed.

2. The deck system of claim 1, wherein the first edge of each plank has at least one first hook member and the second edge of each plank has at least one second hook member, the at least one second hook member configured to engage with the at least one first hook member of another plank.

3. The deck system of claim 2, wherein the first and second hook members are sized and shaped so as to fit snuggly together when two or more planks are coupled together.

4. The deck system of claim 1, wherein the plurality of planks includes a quantity of planks selected so that when the planks are coupled together the deck body covers the entire length of the cargo bed.

5. The deck system of claim 1, wherein each of the planks is of sufficient length so that the deck body spans the entire width of the cargo bed.

6. The deck system of claim 1, wherein the rail assembly includes a pair of elongate rail capture members, each rail capture member having a mounting flange configured to be supported by an upper surface of one of the side rails and a main body configured to be coupled to the deck body.

7. The deck system of claim 6, wherein the rail assembly further includes at least one elongate rail section configured to be coupled to the rail capture member and to support the deck body at a distance above the rail capture member.

8. The deck system of claim 7, wherein each rail section has at least one groove therein, the rail capture member has at least one ridge therein configured to engage the groove in the rail section to secure the rail section to the rail capture member.

9. The rail assembly of claim 6, further comprising at least one leg member configured to be coupled to one of the rail capture members and a floor of the cargo bed so as to support the rail assembly.

10. The deck system of claim 1, wherein at least one of the planks is a main plank having a hollow aperture therein.

11. The deck system of claim 1, wherein at least one of the planks is a secondary plank, each secondary plank having at least one capture channel therein.

12. The deck system of claim 10, further comprising at least one slider assembly, each slider assembly configured to be extended out from the sides of the deck body.

13. The deck system of claim 12, wherein each slider assembly includes:
   a. at least one elongate slider member, each slider member having a first end and a second end opposite the first end, the second end is configured to be slidably received in the aperture in one of the main planks; and
   b. at least one elongate side member configured to securely engage the first end of the at least one slider member.

14. The deck system of claim 13, wherein at least one elongate side member includes:
   a. a lower side member; and
   b. an upper side member coupled to the lower side member so as to define an elongate channel therebetween;
   c. wherein the channel is configured to securely engage the first end of the at least one slider member at locations within the channel that correspond to the locations of the main planks in the deck body.

15. The deck system of claim 9, wherein each leg comprises at least one capture channel extending lengthwise along at least part of its longitudinal length.

16. The deck system of claim 1, further comprising at least one wedge, each wedge configured to secure two of the plurality of planks together.

17. The deck system of claim 2, further comprising at least one wedge, each wedge configured to be received between hook members on two adjacent planks to secure the two planks together.

* * * * *